United States Patent
Izumihara et al.

(10) Patent No.: US 9,874,255 B2
(45) Date of Patent: Jan. 23, 2018

(54) DECOUPLING BRAKE COMPONENT

(71) Applicant: AKEBONO BRAKE INDUSTRY CO., LTD., Chuo-Ku, Tokyo (JP)

(72) Inventors: Toshitaka Izumihara, Novi, MI (US); Matthew Robere, Novi, MI (US); Masayuki Ueda, Satte (JP); Ishiguro Isao, Kazo (JP); Tadasuke Fujiwara, Novi, MI (US)

(73) Assignee: AKEBONO BRAKE INDUSTRY CO., LTD., Tokyo (JP)

( * ) Notice: Subject to any disclaimer, the term of this patent is extended or adjusted under 35 U.S.C. 154(b) by 341 days.

(21) Appl. No.: 14/215,354

(22) Filed: Mar. 17, 2014

(65) Prior Publication Data
US 2015/0260243 A1 Sep. 17, 2015

(51) Int. Cl.
*F16D 65/095* (2006.01)
*F16D 65/00* (2006.01)
*F16D 65/097* (2006.01)

(52) U.S. Cl.
CPC ..... *F16D 65/0006* (2013.01); *F16D 65/0971* (2013.01)

(58) Field of Classification Search
CPC .......................... F16D 65/0006; F16D 65/0971
USPC ................................. 188/73.35, 73.36, 73.37
See application file for complete search history.

(56) References Cited

U.S. PATENT DOCUMENTS

| | | | |
|---|---|---|---|
| 3,506,098 A | 4/1970 | Anders | |
| 3,976,167 A * | 8/1976 | Hirai | F16D 55/227 188/1.11 L |
| 4,093,045 A * | 6/1978 | Kawamura | F16D 65/0971 188/73.37 |
| 4,155,430 A * | 5/1979 | Kawamura | F16D 65/0006 188/73.37 |
| 4,572,336 A | 2/1986 | Smith et al. | |
| D337,557 S | 7/1993 | Steinke et al. | |
| D350,517 S | 9/1994 | Steinke et al. | |
| D356,535 S | 3/1995 | Steinke et al. | |
| D356,988 S | 4/1995 | Steinke et al. | |
| D361,051 S | 8/1995 | Steinke et al. | |
| D362,225 S | 9/1995 | Steinke et al. | |
| D368,452 S | 4/1996 | Steinke et al. | |
| D368,454 S | 4/1996 | Steinke et al. | |

(Continued)

FOREIGN PATENT DOCUMENTS

DE 4021493 A1 1/1992
FR 2877705 * 5/2006

(Continued)

OTHER PUBLICATIONS

Genuine-Brake Pad Shim Set, available at www.carid.com/2001-lexus~gs-brake-parts/item-8791215.html, last accessed Nov. 5, 2013.

(Continued)

*Primary Examiner* — Bradley King
(74) *Attorney, Agent, or Firm* — The Dobrusin Law Firm, P.C.

(57) ABSTRACT

A brake component comprising: (a) one or more tie bars, and (b) one or more open spaces on each side of the tie bar, wherein during a brake apply the one or more tie bars each allow a brake pad to rotate into the open spaces of the brake component while the tie bar remains an only point of contact of the brake component.

20 Claims, 6 Drawing Sheets

Figure 7

(56) References Cited

U.S. PATENT DOCUMENTS

| | | | |
|---|---|---|---|
| D368,455 S | 4/1996 | Steinke et al. | |
| 5,538,104 A * | 7/1996 | Katz | F16D 65/02 188/250 B |
| 6,105,736 A | 8/2000 | Akita et al. | |
| 6,170,618 B1 * | 1/2001 | Rueckert | F16D 65/0979 188/250 E |
| 6,170,620 B1 * | 1/2001 | Akita | F16D 65/0006 188/251 A |
| 6,256,858 B1 | 7/2001 | Brosilow | |
| 6,257,379 B1 | 7/2001 | Matsumoto et al. | |
| 6,481,545 B1 | 11/2002 | Yano et al. | |
| 6,913,120 B2 | 7/2005 | Bosco et al. | |
| 7,481,304 B2 * | 1/2009 | Tsurumi | F16D 65/0971 188/250 E |
| 8,191,690 B2 | 6/2012 | Kappagantu et al. | |
| 8,205,726 B2 * | 6/2012 | Schorn | F16D 65/095 188/250 B |
| 2003/0221919 A1 | 12/2003 | Kumamoto et al. | |
| 2004/0035651 A1 | 2/2004 | Renauld | |
| 2006/0278482 A1 | 12/2006 | Kahan et al. | |
| 2007/0295567 A1 * | 12/2007 | Adams | F16D 65/0006 188/218 XL |
| 2010/0236878 A1 * | 9/2010 | Maehara | F16D 55/224 188/73.36 |
| 2012/0152667 A1 | 6/2012 | Bosco, Jr. | |
| 2014/0124303 A1 * | 5/2014 | Hoxie | B60T 1/065 188/1.11 W |

FOREIGN PATENT DOCUMENTS

| | | | | |
|---|---|---|---|---|
| GB | 2115507 A | * | 9/1983 | F16D 55/22 |
| JP | 09151970 A | * | 6/1997 | |
| JP | H09151970 A | | 6/1997 | |
| KR | 20120104740 A | | 9/2012 | |
| WO | 2008/097025 A1 | | 8/2008 | |

OTHER PUBLICATIONS

Guangzhou Yifeng Trading Firm, available at www.yifengfilter.en.alibaba.com/product/569984451-210178886/brake_pad_shim_clip_accessary.html, last accessed Nov. 5, 2013.
591629-Brake Pad Shim RHR Out LHR in RRC, available at www.brit-car.co.uk/product.php/213377/757/brake_pad_shim_rhr_out_lhr_in_rrc, last accessed Nov. 5, 2013.
Summit Racing Equipment, available at www.summitracing.com/parts/bck-084-2048?seid-srece1&gclid-CPqEhtyEzroCFalaMgodvB4AYg, last accessed Nov. 5, 2013.
2002 Subaru Impreza shim, available at http://www.weblumen.com/index.php/suby/performance-mods/71-2002-subaru-impreza-brake-pad-replacement, last accessed Nov. 5, 2013.
1998 Toyota Camry shim, available at http://www.carid.com/1998-toyota-camry-brake-parts/item-8885657.html, last accessed Nov. 5, 2013.
2005 Subaru WRX shim, available at http://www.carid.com/2005-subaru-wrx-brake-parts/item-8889221.html, last accessed Nov. 5, 2013.
Extended European Search Report for Application No. 15151916.2 dated Oct. 15, 2015.

* cited by examiner

DECOUPLING BRAKE COMPONENT

FIELD

The present teachings relate to shim and/or piston that includes a tie bar that allows a brake pad rotate about one or more pistons so that movement of the brake pad is decoupled from the piston.

BACKGROUND

The present teachings are predicated upon providing a device for use in a disc brake system for use with vehicles. For example, the disc brake system may be used with almost any vehicle (e.g. car, truck, bus, train, airplane, or the like). Alternatively, the disc brake system may be integrated into assemblies used for manufacturing or other equipment that require a brake such as a lathe, winder for paper products or cloth, amusement park rides, wind turbines, or the like. However, the present teachings are most suitable for use with a passenger vehicle (e.g., a car, truck, sports utility vehicle, or the like).

Generally, a floating caliper braking system includes a rotor, a caliper body, a support bracket, an inboard brake pad, and an outboard brake pad that are on opposing sides of the rotor. The caliper body further includes one or more fingers (with or without a piston), one or more piston bores, and a bridge that connects the one or more fingers to the piston bore or two opposing piston bores together. The piston bore houses a piston. The piston bore has a bore axis that the piston moves along during a brake apply and a brake retract. The piston bore may include a fluid inlet, a closed wall, a front opening, and a cylindrical side wall that includes a seal groove located near the front opening. Typically, the fluid inlet is located in the closed wall of the piston bore so that when pressure is applied the fluid will flow into the piston bore. During a pressure apply the fluid will push the piston towards the front opening and into contact with a brake pad that generally includes a pressure plate and friction material and the friction material will contact the rotor on one side and an opposing brake pad will contact the rotor on an opposing side creating friction to stop rotation of the rotor and any component connected to the brake system. The brake pads may slide on an abutment along an axis of the pistons or the brake pads may include holes that receive pins and the brake pads may slide on pins that extend through the brake system so that a friction force may be created.

Similarly, a fixed caliper braking system includes one or more sets of opposing pistons. During a brake apply the opposing sets of pistons may be moved towards each other and into contact with a set of opposing brake pads until the brake pads are moved into contact with a rotor creating a braking force. In some instances one or more shims may be placed between the piston and brake pad. However, during braking conditions (i.e., running) of both the floating caliper braking system and the fixed caliper braking system the brake pads may move within the brake system and vibrations, noise, harshness (NVH), the like, or a combination thereof may be transferred from the brake pads through the piston and into the brake system and the vibrations and/or noise created may be heard and/or felt by a user and/or an occupant of a vehicle which may be undesirably to the user and/or occupant.

Examples of braking systems and shims used in braking systems are disclosed in U.S. Pat. Nos. D337,557; D361,051; 4,155,430; 4,572,336; 6,105,736; and U.S. Patent Application Publication No. 2013/0025982 all of which are expressly incorporated herein by reference for all purposes. It would be attractive to have a brake system that is free of rattling and/or vibration during running, braking conditions, or both. What is needed is a device that decouples the brake pads from the piston, the rest of the brake system, or both. What is needed is a device that allows a brake pad to move independently of other components in the brake system. What is needed is a feature that prevents a transfer of noise, vibration, or harshness from a brake pad to other components in the brake system.

SUMMARY

One possible example of the present teachings include: a brake component comprising: (a) one or more tie bars, and (b) one or more open spaces on each side of the tie bar, wherein during a brake apply the one or more tie bars each allow a brake pad to rotate into the open spaces of the brake component while the tie bar remains an only point of contact of the brake component.

One possible embodiment of the present teachings include: a brake system comprising: (a) a caliper having: (i) one or more a piston bores and (ii) a piston located within each of the one or more piston bores; (b) two or more brake pads located within the caliper; and (c) a shim in communication with at least one of the two or more brake pads, wherein the shim includes: (i) one or more tie bars, and (ii) one or more open spaces on each side of the tie bar, wherein during a brake apply each of the one or more pistons contact the one or more tie bars and the one or more open spaces on each side of the tie bar allows each of the two or more brake pads to rotate into the one or more open spaces on each side of the tie bar while the tie bar remains an only point of contact with each of the one or more pistons so that the piston moves at least one of the two or more brake pads along an axis of the piston bore.

The present teachings provide a brake system that is free of rattling and/or vibration during running, braking conditions, or both. The present teachings provide a device that decouples the brake pads from the piston, the rest of the brake system, or both. The present teachings provide a device that allows a brake pad to move independently of other components in the brake system. The present teachings provide a feature that prevents a transfer of noise, vibration, or harshness from a brake pad to other components in the brake system.

DETAILED DESCRIPTION

The explanations and illustrations presented herein are intended to acquaint others skilled in the art with the invention, its principles, and its practical application. Those skilled in the art may adapt and apply the invention in its numerous forms, as may be best suited to the requirements of a particular use. Accordingly, the specific embodiments of the present invention as set forth are not intended as being exhaustive or limiting of the teachings. The scope of the teachings should, therefore, be determined not with reference to the above description, but should instead be determined with reference to the appended claims, along with the full scope of equivalents to which such claims are entitled. The disclosures of all articles and references, including patent applications and publications, are incorporated by reference for all purposes. Other combinations are also possible as will be gleaned from the following claims, which are also hereby incorporated by reference into this written description.

The present teachings provide a brake system that may be used to create a braking force. The brake system may include a rotor, a caliper, one or more brake pads, and a support bracket. The brake system may include one or more brake components as discussed herein. The brake system may be a floating caliper brake system, a fixed caliper brake system, or both. The brake system may be free of a support bracket. The caliper may also be a support bracket or include support bracket features. The brake system may include one or more pistons. The brake system may include opposing pistons. Preferably, the brake system includes one or more pistons on one side of a rotor so that when the piston moves a brake pad into contact with a rotor, the caliper moves until fingers move an opposing brake pad into contact with an opposing side of the rotor.

The caliper may function to create a friction force during a brake apply. The caliper may include one or more pistons that move during a brake apply to create a friction force. The caliper may include one or more pistons on each side of the caliper so that the caliper is substantially static during a brake apply. The caliper may include opposing pistons that extend substantially along the same axis. The caliper body may include a bridge, one or more fingers, one or more piston bores, or a combination thereof. The caliper may include one or more pistons, two or more pistons, four or more pistons, or even six or more pistons and related piston bores. The one or more piston bores house the one or more pistons and may include any, all, or a combination of a fluid inlet, a closed wall, a front opening, a cylindrical side wall that includes an annular groove near the front opening, and a seal in the annular groove.

The one or more pistons function to move one or more brake pads, the caliper, generate a force, create a friction force, or a combination thereof. The one more pistons may include an outer rim that is generally circular and may be located at an end of the generally cylindrical shape of the piston. The one or more pistons may function to force one or more brake pads into contact with a moving rotor so that movement of the rotor is slowed and/or stopped. The one or more pistons may move along an axis of the piston bore, the piston, the rotor, or a combination thereof to create a friction force. The one or more pistons may axially move the one or more brake pads into contact with the rotor so that a friction force is created. The one or more pistons may maintain alignment generally along the axis of the piston bore, the rotor, or both during running, a brake apply, a brake retract, or a condition therebetween. The one or more pistons may maintain alignment along the axis while the one or more pistons are in contact with the one or more brake pads.

The brake system includes one or more brake pads (e.g., an inboard brake pad and an outboard brake pad located on opposing sides of the rotor). The one or more brake pads may contact a rotor and slow movement of the rotor, stop movement of the rotor, or both so that a friction force is created. The one or more brake pads may include a shim, a pressure plate, a friction material, or a combination thereof. The one or more brake pads may axially slide upon one or more pins to create a braking force. One or more of the brake pads may have one or more ears or an area that projects out from the body of the brake pad. An ear of a brake pad may connect the brake pad to the support bracket, the caliper, or both directly or indirectly. For example, an ear of the brake pad may connect to the support bracket using a pad.

The support bracket or support bracket portion of the caliper may function to connect the brake system to a corner module (e.g., a knuckle). The support bracket may be any static part of the brake system. The support bracket may directly or indirectly support the brake pads. The support bracket may include one or more pad dips that assist in holding the one or more brake pads. The caliper and the support bracket may be one unitary piece. Preferably, the support bracket and caliper may be two discrete pieces. The support bracket may connect the caliper indirectly to a corner module. The support bracket may provide support to the caliper so that the caliper moves during a brake apply. The support bracket may be sized so that the caliper extends on both sides of the support bracket and a rotor extends through a center of the support bracket. Preferably, the support bracket includes at least two opposing projections and/or at least two opposing abutments that guide the brake pads during a brake apply and retain the brake pads within the support bracket during non-braking conditions (e.g., running). A pair of brake pads may be used in the brake system, and the pair of brake pads may extend from an abutment on a trailing side of the support bracket to an abutment on a leading side of the support bracket.

The brake pads may be held in communication with the support bracket, the pistons, or both with one or more pad clips. The one or more pad clips and preferably a plurality of pad clips may function to hold one or more brake pads, allow one or more brake pads to move along an axis of a rotor, create a low friction surface for the brake pads to move along, or a combination thereof. Preferably, the pad clips connect an ear of one or more brake pads to the support bracket. Preferably, the pad clips generally mirror the shape of a portion of the support bracket (e.g., shaped to fit around the at least two opposing projections and/or within the at least two opposing abutments of the support bracket), have a generally complementary shape to the support bracket and/or ear of the brake pad, or both. The brake system may include one or more pad clips, one or more shims, one or more brake components, or a combination thereof that are in contact with the brake pads, the caliper, the support bracket, or a combination thereof.

The brake component may be a piston, a shim, or both as are discussed herein. The shim may function to create a point of contact between each of the one or more pistons and one or more brake pads. The shim may function to reduce noise, vibration, harshness (NVH), or a combination thereof. The shim may reduce a distance between the pistons and the pressure plate of a brake pad. The shim may provide a point of contact between the piston and brake pad. For example, the piston may only contact a portion of the shim so that less than an entire area of the piston is in contact with the shim. The shim has a longitudinal axis. The longitudinal axis may separate the shim so that the shim has an upper portion and a lower portion relative to the longitudinal axis. The shim has a lateral axis. The lateral axis may bisect the shim. The lateral axis may separate a leading side from a trailing side of the shim. The shim may include one or more tie bars that contact the piston, the piston may include one or more tie bars that contact the shim, or a combination of both.

The one or more tie bars may function to create a single point and/or single region of contact between the piston and the shim. The one or more tie bars may function to create a contact region around the axis of the piston, along the axis of the piston, proximate to the axis of the piston, or a combination thereof. The one or more tie bars may function to allow the brake pad to rotate relative to the piston during a brake apply. The one or more tie bars may allow the brake pads to rotate so that the tie bar is an only region of contact, point of contact, location of contact, or a combination thereof between the shim, brake pad, or both and the piston. The brake system may include the same number of tie bars as pistons at all times (e.g., when the brake pad is rotated, not rotated, or a condition therebetween). For example, if the brake system includes four pistons then the brake system includes four tie bars. The one or more tie bars may be located along a central region of the one or more pistons. The one or more tie bars may be an elevated portion of the shim, the piston or both. The one or more tie bars may be coplanar with the rest of the shim. The one or more tie bars may be configured so that contact between the shim, the piston, the brake pad, or a combination thereof is equally distributed, along the axis of the piston, the piston bore, or both or parallel to the axis of the rotor. The one or more tie bars may be created by a recess, an absence of material, a through hole, a window, a cutout, or a combination thereof being located proximate to, on one or more sides, or both of the tie bar. Preferably, the tie bar is the presence of material in a shim and the material around the tie bar has been removed. However, the tie bar may be an elevated portion of a piston such that a single region of contact is formed on the contact surface of the piston. The one or more tie bars may be located in a central region, one an edge, on a top, on a bottom, on a side, or a combination thereof of a shim, a piston or both. The one or more tie bars may be vertically oriented, horizontally oriented, diagonally oriented, or any position there between relative to the longitudinal axis of the one or more brake pads. The one or more tie bars may have a width. The width may be sufficiently wide so that the one or more brake pads are moved in the axial direction, the one or more brake pads are movable about the longitudinal axis of the brake pads, or both. The width may be sufficient so that the force of the piston against the brake pad does not deflect the brake pad at the point of contact. The width may be about 1 mm or more, 5 mm or more, 10 mm or more, or even 20 mm or more. The width may be about 5 cm or less, about 4 cm or less, or about 3 cm or less. The one or more tie bars may extend between or proximate to one or more open spaces such as windows and/or cutouts.

The one or more open spaces may be located proximate to the tie bar. The one or more open spaces may be located proximate to the one or more tie bars so that the one or more tie bars create a point of contact, a region of contact, or both between the piston and the shim, the brake pad, or both. The one or more open spaces may be located so that the brake pad may rotate about its longitudinal axis; about the axis of the piston, the piston bore, the rotor, or a combination thereof; may move laterally: may rotate without contacting the piston at a location other than the tie bar, or a combination thereof. The one or more open spaces may be sufficiently large so that the brake pads can rotate to a point where the piston enters the shim, the brake pad rotates so that a plane of the brake pad intersects a plane of the face of the piston, or both. The one or more open spaces may allow the brake pad to pivot about the piston bore axis. The one or more open spaces may be large enough so that the brake pad and shim may rotate without a portion of the brake pad, the shim, or both contacting the piston outside of the tie bar. The one or more open spaces may allow the brake pad to rotate without the outer rim of the piston contacting the shim, the brake pad, or both outside the tie bar. The cross-sectional length (e.g., diameter) of each of the one or more open spaces may be larger than the cross-sectional length of the piston so that the piston cannot contact the shim and/or piston in a region other than the tie bar. The one or more open spaces may allow the brake pad to rotate so that the brake pad is decoupled from the piston. For example, the piston may extend into an open space and be free of contact with the brake pad, the shim, or both so that the brake pad and piston are decoupled (e.g., NVH is not transferred from one component to the other and vice versa) relative to each other. The one or more open spaces may be an absence of material above a tie bar such that the lack of material is the one or more open spaces. The one or more open spaces may be a through hole. The one or more open spaces may have any shape so that the brake pad may rotate relative to the piston. The one or more open spaces may be half-moon shaped, half a circle, square, rectangular, triangular, symmetrical, asymmetrical, geometric, or a combination thereof. The one or more open spaces may be step down of material creating a raised piece of material (i.e., tie bar). The one or more open spaces may be oriented so that one or more open spaces are located on a leading side of a tie bar and one or more open spaces are located on a trailing side of a cutout. There may be more than one open space on each side of the tie bar; however, preferably there may be a single open space on each side of the tie bar. Each tie bar may extend through its own set of open spaces. When more than one tie bar is present the tie bars may share an open space on one or both sides. The one or more open spaced may be located partially and/or entirely on one side of the longitudinal axis, lateral axis, or both. The longitudinal axis, the lateral axis, or both may extend through a portion of an open space. Preferably, each of the open spaces is entirely located on one side of the longitudinal axis. The one or more open spaced may extend parallel to the lateral axis, the longitudinal axis, or both. The one or more open spaces may be oriented so that when more than one space is present the spaces are evenly distributed, an even application of force is provided to the brake pad, the trailing side, the leading side, or both are evenly moved, receive an equal distribution of force, or a combination thereof. The one or more open spaces may be arranged so that one or more open spaces are evenly spaced apart; evenly located relative to the piston, the shim, or both; each have an equal area; so that a force is evenly distributed between the pistons, the brake pads, the shims, or a combination thereof via the tie bars. The one or more open spaces may be one or more windows, one or more cutouts, or both. Preferably, the one or more open spaces may be a window when the open spaces are in a shim. Preferably, the one or more open spaces may be cutouts when the open spaces are in the piston.

Figure 1:
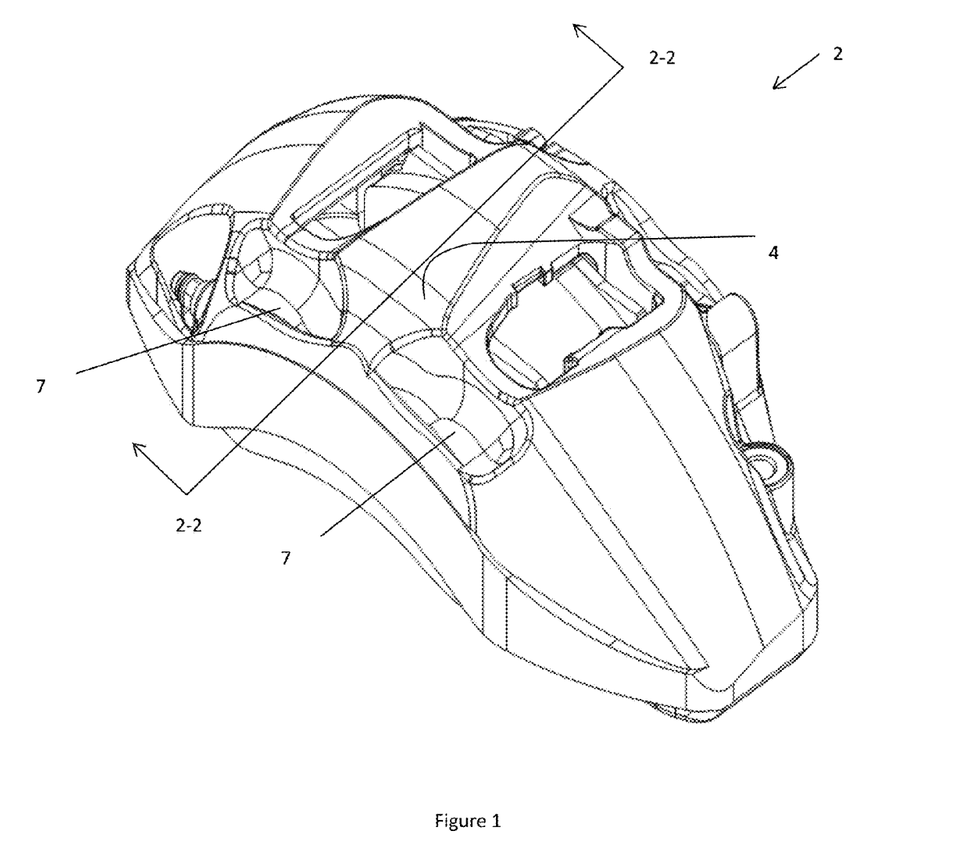
FIG. 1 illustrates an example of a brake system.

FIG. 1 illustrates a perspective view of a brake system 2. The brake system 2 includes an example of caliper 4 with multiple opposing piston bores 7.

Figure 2:
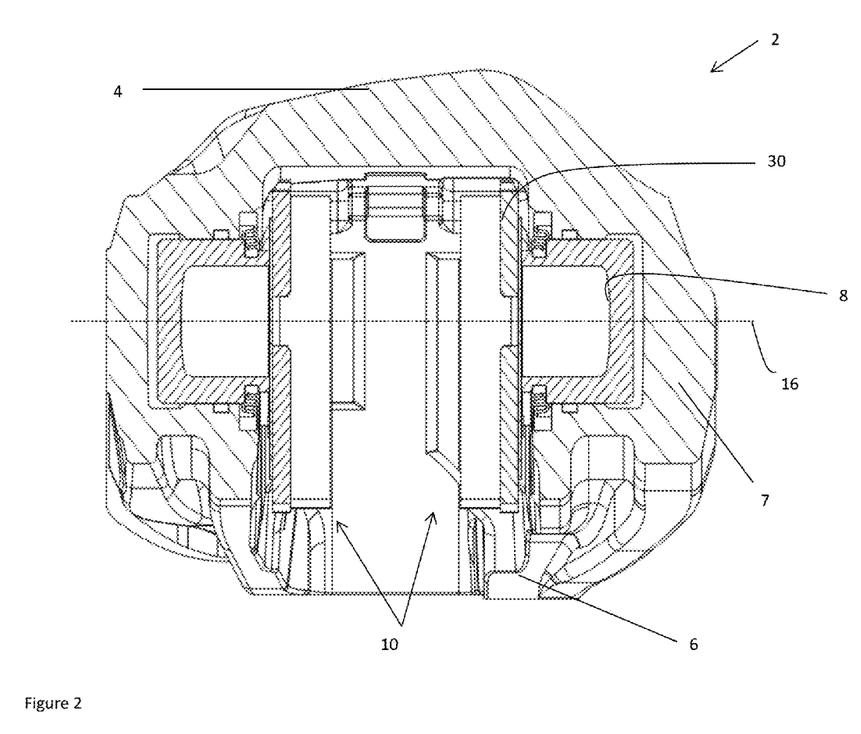
FIG. 2 illustrates a cross-sectional view of the brake system of FIG. 2.

FIG. 2 illustrates a cross-sectional view of the brake system 2 of FIG. 1 along lines 2-2. The brake system 2 includes an integral support bracket 6 connected to a caliper 4. The support bracket 6 includes a piston bore 7 that houses a piston 8. The piston 8 is in contact with a shim 30 that is located between a brake pad 10 and the piston 8. The piston 8 is movable along a piston bore axis 16 to create a friction force during a brake apply.

Figure 3:
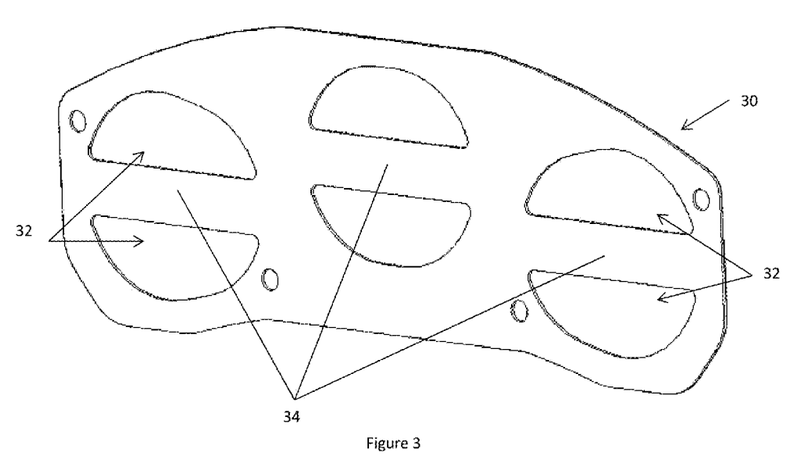
FIG. 3 illustrates a perspective view of a shim.

FIG. 3 illustrates a perspective view of one example of a shim 30 including a plurality of windows 32 that are separated by a tie bar 34.

Figure 4:
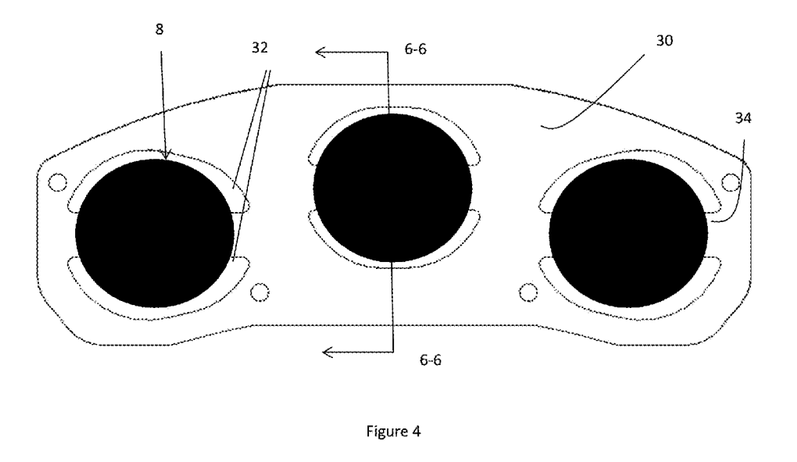
FIG. 4 illustrates a plan view of a shim and pistons.

FIG. 4 illustrates a top view of a plurality of pistons 8 in contact with the shim 30. The shim 30 is in contact with and covers a brake pad so that the brake pad is not visible. The pistons 8 are smaller than the windows 32, which extend through the shim 30, so that during a brake apply the pistons 8 only contact the tie bar 34 of the shim 30.

Figure 5:
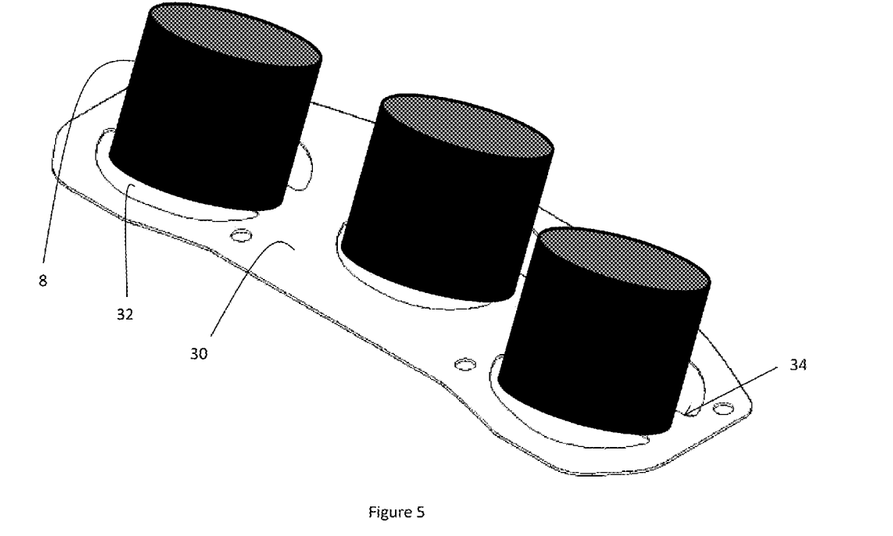
FIG. 5 illustrates a perspective view of the shim and pistons of FIG. 4.

FIG. 5 illustrates a perspective view of the pistons 8 and shim 30 of FIG. 5 with the brake pad removed. The pistons 8 cover the tie bar 34 and are smaller than the windows 32 in the shim 30 so that the pistons 8 may extend into a window 32 during movement of the shim 30 and brake pad (not shown).

Figure 6:
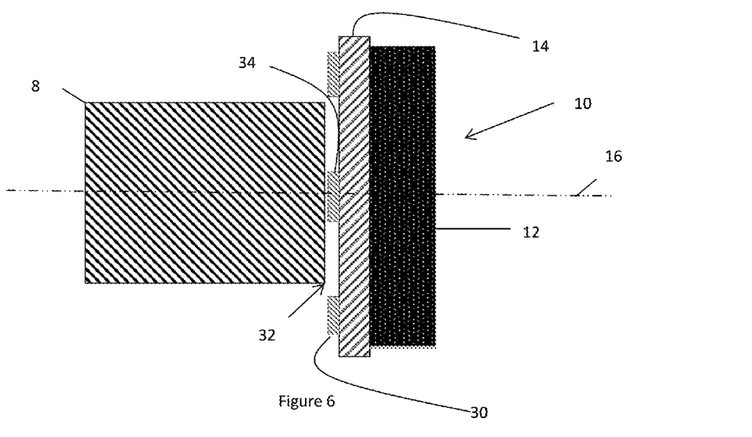
FIG. 6 illustrates a side view of a piston extending along an axis and being in contact with the shim and brake pad.

FIG. 6 is a cross-sectional view of FIG. 4 along lines 6-6. The piston 8 extends along a piston bore axis 16 and is contact with the tie bar 34 of the shim 30 so that a portion of the piston 8 extends over the tie bar 34 but does not extends beyond a window 32 to the next piece of shim 30. The shim 30 is in contact with a pressure plate 14 of a brake pad 10 so that the pressure plate 14 moves the friction material 12 of the brake pad 10 to create a braking force during a brake apply.

Figure 7:
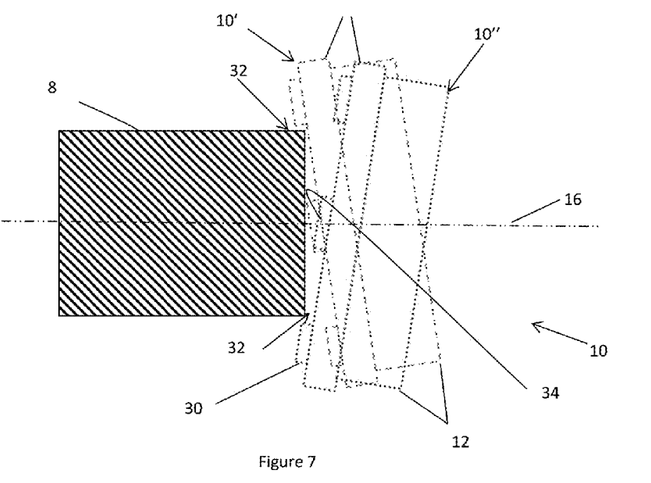
FIG. 7 illustrates an example of a brake pad rotating about a tie bar of a shim.

FIG. 7 illustrates a cross-sectional view of movement of a brake pad 10. The brake pad 10 during a brake apply may move so that the brake pad 10 moves from resting position (as is shown in FIG. 6) to an alpha position 10', a beta position 10", or a position therebetween. The piston 8 during movement, generally moves along the piston bore axis 16 and is substantially aligned along the piston bore axis 16. If the brake pad 10 is moved about the piston bore axis 16 to the alpha position 10' or beta position 10" the tie bar 34 of the shim 30 will be in contact with the piston 8, and the windows 32 will allow for movement of the brake pads 10 so that the center of force on the pressure plate 14 and the friction material 12 is maintained along the piston bore axis 16. The windows 32 further decouple the piston 8 and the brake pad 10 by allowing movement of the brake pads 10 without contacting the pistons so that any vibrations are not transferred from the piston 8 to the brake pads 10 or vice versa.

Figure 8:
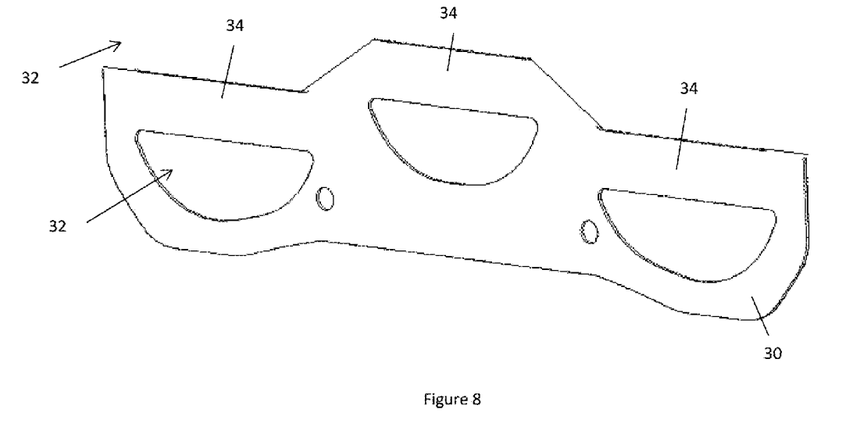
FIG. 8 illustrates a perspective view of another example of a shim.

FIG. 8 illustrates a perspective view of another example of a shim 30. The shim 30 includes one continuous tie bar 34 at a top of the shim 30 that is broken into three tie bar segments 34 so that a window 32 is effectively formed above the tie bars 34. Each tie bar segment 34 includes a window 32 in the shim 30 below the tie bars 34 so that each tie bar 34 is located between each window 32.

Figure 9:
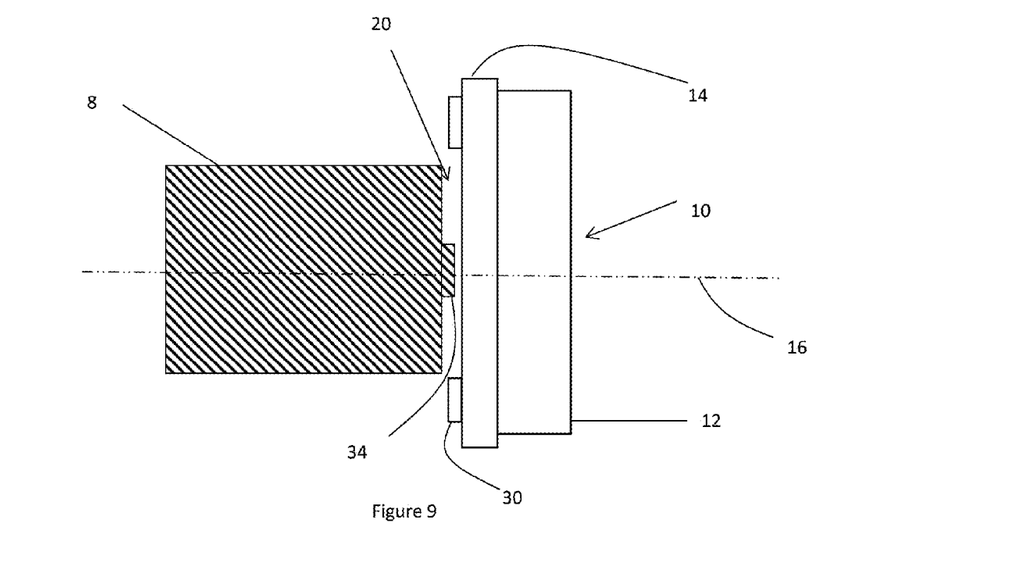
FIG. 9 illustrates a side view of an example of a piston including a tie bar extending along an axis.

FIG. 9 illustrates a cross-sectional view of another embodiment of the present teachings, where the piston 8 includes a cutout 20 proximate to the shim 30 so that during movement of the piston 8 along the piston bore axis 16 a force from the piston 8 is maintained substantially proximate to the piston bore axis 16 regardless of the position of the brake pad 10. The cutouts 20 in along the piston 8 create open spaces around the tie bar 34 (as shown in the cross-section) so that the tie bar 34 allows the brake pad 10 to rotate but allows the piston 8 to remain substantially perpendicular to the piston bore axis 16 so that the piston 8 can push the pressure plate 14 and friction material 12 to create a braking force. The cutouts 20 around the tie bar 34 decouple the piston 8 from vibrations caused by movement of the brake pad 10 so that the vibrations are not transferred to the brake system through the piston 8.

Figure 10:
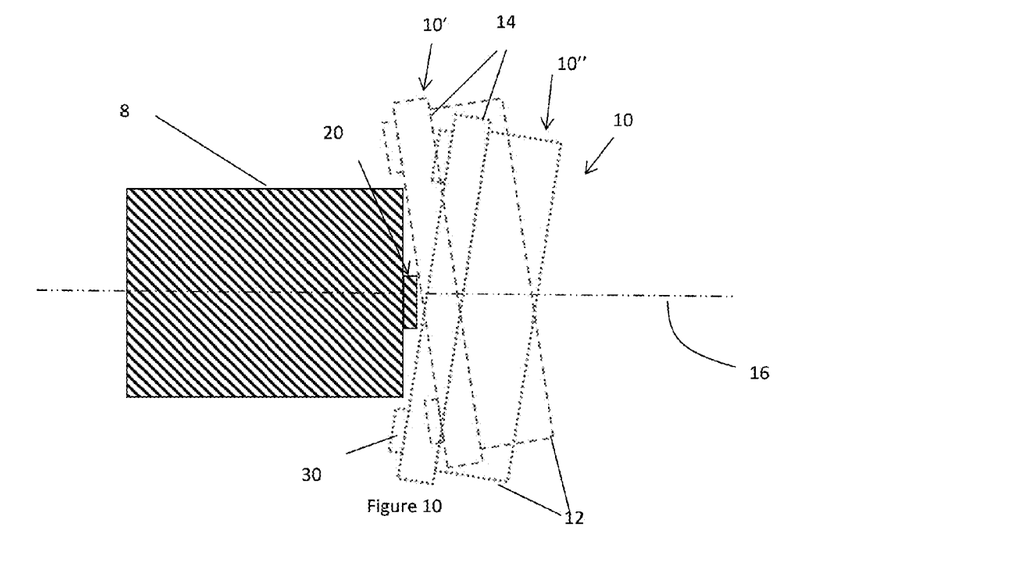
FIG. 10 illustrates a side view of a brake pad rotating the tie bar of FIG. 9.

FIG. 10 illustrates a cross-sectional view of a brake pad 10 laterally moving from a resting position (as is shown in FIG. 9) to an alpha position 10', a beta position 10", or a position therebetween (as illustrated the brake pad moves about the piston bore axis 16). The brake pad 10 (e.g., pressure plate 14 and friction material 12) is moving relative to the piston bore axis 16 by rotating about the tie bar 34 located between cutouts 20. The tie bar 34 maintains the piston 8 in contact with the pressure plate 14 of the brake pad 10 so that a center of force is substantially along the piston bore axis 16 so that the piston 8 and brake pad 10 are moved along the piston bore axis 16 during a brake apply and a brake retract.

Any numerical values recited herein include all values from the lower value to the upper value in increments of one unit provided that there is a separation of at least 2 units between any lower value and any higher value. As an example, if it is stated that the amount of a component or a value of a process variable such as, for example, temperature, pressure, time and the like is, for example, from 1 to 90, preferably from 20 to 80, more preferably from 30 to 70, it is intended that values such as 15 to 85, 22 to 68, 43 to 51, 30 to 32 etc. are expressly enumerated in this specification. For values which are less than one, one unit is considered to be 0.0001, 0.001, 0.01 or 0.1 as appropriate. These are only examples of what is specifically intended and all possible combinations of numerical values between the lowest value and the highest value enumerated are to be considered to be expressly stated in this application in a similar manner. The use of the terms "comprising" or "including" to describe combinations of elements, ingredients, components or steps herein also contemplates embodiments that consist essentially of the elements, ingredients, components or steps. By use of the term "may" herein, it is intended that any described attributes that "may" be included are optional.

Plural elements, ingredients, components or steps can be provided by a single integrated element, ingredient, component or step. Alternatively, a single integrated element, ingredient, component or step might be divided into separate plural elements, ingredients, components or steps. The disclosure of "a" or "one" to describe an element, ingredient, component or step is not intended to foreclose additional elements, ingredients, components or steps.

What is claimed is:

1. A brake component comprising:
   a. at least one tie bar, and
   b. one or more open spaces on each side of the at least one tie bar,
   wherein during a brake apply, the at least one tie bar allows the brake component and a brake pad to pivot about a center axis of a piston bore while the at least one tie bar remains an only point of contact between the brake pad and a piston, the brake component and the brake pad pivot about the center axis of the piston bore such that as one side of the brake component and the brake pad pivots towards the piston another side of the brake component and the brake pad pivots away from the piston, and wherein during the brake apply, the piston maintains alignment generally along the center axis of the piston bore.

2. The brake component of claim 1, wherein each of the one or more open spaces are a window that is a through hole through the brake component, and
wherein during the brake apply at least a portion of the piston extends into the window.

3. The brake component of claim 2, wherein the brake component is a shim, and during the brake apply or a brake retract, a center of force on the brake pad is maintained along the center axis of the piston bore.

4. The brake component of claim 1, wherein the brake component comprises at least two tie bars,
wherein the at least two tie bars are spaced apart from one another, and
wherein each of the one or more open spaces are a single open space defined on each side of each of the at least two tie bars.

5. The brake component of claim 4, wherein each of the at least two tie bars extend between a different set of the one or more open spaces.

6. The brake component of claim 1, wherein the one or more open spaces are each half-moon shaped.

7. The brake component of claim 1, wherein the at least one tie bar is diagonally oriented relative to a longitudinal axis of the brake component, and an area on a first side of the at least one tie bar is an absence of material creating one of the one or more open spaces, and a second area on a second side of the at least one tie bar is a second absence of material creating a second one of the one or more open spaces.

8. The brake component of claim 7, wherein the shim includes three tie bars,
wherein two of the three tie bars are end tie bars that are located at ends of the shim, and one of three tie bars is a middle tie bar that is located therebetween, and
wherein both of the end tie bars are diagonally oriented relative to a longitudinal axis of the brake component and the middle tie bar is vertically oriented relative to the longitudinal axis of the brake component.

9. The brake component of claim 1, wherein the one or more open spaces on each side of the at least one tie bar are larger than the piston so that an outer rim of the piston only contacts the at least one tie bar when the brake pad and the brake component pivot about the center axis of the piston bore.

10. The brake component of claim 1, wherein the at least one tie bar is adapted to allow the brake component to pivot during the brake apply or a brake release so that at least a portion of the piston extends into the one or more open spaces when the brake component and the brake pad pivots towards the piston.

11. The brake component of claim 1, wherein the at least one tie bar is oriented from top to bottom of the brake component.

12. A brake system comprising:
a. a caliper having:
i. one or more piston bores on an inboard side;
ii. one or more piston bores on an outboard side; and
iii. a plurality of pistons, with one of the pistons located within each of the one or more piston bores on the inboard side and on the outboard side;
b. two or more brake pads located within the caliper with at least one of the two or more brake pads being located on the inboard side and at least one of the two or more brake pads being located on the outboard side; and
c. two or more shims, wherein each one of the shims is in communication with one of the two or more brake pads, wherein each of the shims include:
i. one or more tie bars, and
ii. one or more open spaces defined on each side of the one or more tie bars,
wherein during a brake apply, each of the pistons contact one of the one or more tie bars so that the pistons move at least one of the two or more brake pads, and
wherein the one or more open spaces on each side of the one or more tie bars allow each of the two or more brake pads to pivot such that as one side of each of the two or more brake pads pivot towards the pistons another side of each of the two or more brake pads pivot away from the pistons while the pistons move at least one or the two or more brake pads and while the pistons are each maintained in axial alignment with an axis of the one or more piston bores, the one or more tie bars remain an only point of contact with: each of the pistons.

13. The brake system of claim 12, wherein an outer rim of each of the pistons is free of contact with each of the shims at a location other than the one or more tie bars.

14. The brake system of claim 12, wherein the caliper includes four or more pistons.

15. The brake system of claim 12, wherein each of the one or more open spaces are windows, and the windows are through holes in each of the shims, and
wherein the one or more tie bars are the only point of contact between each of the shims and each of the pistons.

16. The brake system of claim 15, wherein the windows are larger than each of the pistons.

17. The brake system of claim 15, wherein the windows decouple the brake pads from the caliper so that vibrations are not transferred from the brake pads to the caliper or vice versa.

18. The brake system of claim 12, wherein the caliper includes six or more pistons in the caliper, with three of the pistons located on the inboard side and three of the pistons located on the outboard side, and
wherein one of the two shims is an inboard shim and another one the two shims is an outboard shim,
wherein each of the inboard shim and the outboard shim have three tie bars that each include one or more open spaces on each side of the three tie bars.

19. The brake system of claim 18, wherein the three tie bars of the inboard shim all are diagonally oriented relative to a longitudinal axis of the brake component, and the outboard shim includes two tie bars that are end tie bars that are located at ends of the shim and one middle tie bar located between the two end tie bars, and the end tie bars are diagonally oriented relative to the longitudinal axis of the brake component and the middle tie bar is vertically oriented relative to the longitudinal axis of the brake component.

20. The brake system of claim 12, wherein during the brake apply or a brake retract, a center of force on each of the two or more brake pads is maintained along the axis of the one or more piston bores so that each of the two or more shims and each of the two or more brake pads are free to pivot about the axis of the one or more piston bores while the pistons maintain alignment along the axis of the corresponding one or more piston bores, and
wherein during the brake apply or the brake retract at least a portion of the pistons extend into the one or more open spaces.

* * * * *

UNITED STATES PATENT AND TRADEMARK OFFICE
CERTIFICATE OF CORRECTION

PATENT NO. : 9,874,255 B2
APPLICATION NO. : 14/215354
DATED : January 23, 2018
INVENTOR(S) : Toshitaka Izumihara et al.

It is certified that error appears in the above-identified patent and that said Letters Patent is hereby corrected as shown below:

Column 9, Line 36: Insert --the-- before "three tie bars"

Column 10, Line 16: Remove "or" and insert --of--

Column 10, Line 19: Remove "with:" and insert --with--

Column 10, Line 43: Insert --of-- before "the two shims"

Signed and Sealed this
Twenty-ninth Day of May, 2018

Andrei Iancu
*Director of the United States Patent and Trademark Office*